(12) United States Patent
Busker

(10) Patent No.: US 11,563,341 B2
(45) Date of Patent: Jan. 24, 2023

(54) UNINTERRUPTIBLE POWER SUPPLY IN WIND POWER INSTALLATIONS

(71) Applicant: Wobben Properties GmbH, Aurich (DE)

(72) Inventor: Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/481,023

(22) Filed: Sep. 21, 2021

(65) Prior Publication Data
US 2022/0103009 A1 Mar. 31, 2022

(30) Foreign Application Priority Data

Sep. 25, 2020 (EP) .................................... 20198466

(51) Int. Cl.
| | |
|---|---|
| *H02J 9/06* | (2006.01) |
| *H02J 3/38* | (2006.01) |
| *F03D 9/11* | (2016.01) |
| *F03D 9/25* | (2016.01) |
| *H02J 3/32* | (2006.01) |

(52) U.S. Cl.
CPC ................ *H02J 9/062* (2013.01); *F03D 9/11* (2016.05); *F03D 9/25* (2016.05); *H02J 3/32* (2013.01); *H02J 3/381* (2013.01); *F05B 2220/706* (2013.01); *H02J 2300/28* (2020.01)

(58) Field of Classification Search
CPC ...... H02J 9/062; H02J 9/06; H02J 3/32; H02J 3/381; H02J 3/38; H02J 2300/28; F03D 9/11; F03D 9/25; F05B 2220/706
See application file for complete search history.

(56) References Cited

U.S. PATENT DOCUMENTS

| | | |
|---|---|---|
| 2008/0084070 A1 | 4/2008 | Teichmann et al. |
| 2009/0228225 A1 | 9/2009 | Burgess |

FOREIGN PATENT DOCUMENTS

| | | |
|---|---|---|
| DE | 102011117649 A1 | 5/2013 |
| EP | 2101392 A2 | 9/2009 |
| EP | 2101392 A3 | 12/2012 |
| JP | 2013-183509 A | 9/2013 |

*Primary Examiner* — Robert L Deberadinis
(74) *Attorney, Agent, or Firm* — Seed IP Law Group LLP

(57) ABSTRACT

Provided is a method for operating a wind power installation including starting a discharge operation of an electrical store of an uninterruptible power supply, in particular at a specific time; performing the discharge operation until the electrical store has a predetermined discharge voltage; detecting a discharge current of the electrical store during the discharge operation; and determining a capacity of the electrical store from the detected discharge current.

20 Claims, 3 Drawing Sheets

UNINTERRUPTIBLE POWER SUPPLY IN WIND POWER INSTALLATIONS

BACKGROUND

Technical Field

The present invention relates to a method for controlling a wind power installation and to such a wind power installation.

Description of the Related Art

Wind power installations are generally known and are usually operated as generating units within an electrical power supply grid, i.e., they inject electrical power into the electrical power supply grid.

Electrical power supply grids, also informally referred to as electrical grid, are a complex network for the transmission and distribution of electrical energy.

Wind power installations are generally installed at the widest variety of locations on Earth, including in regions with many and/or severe wind events, such as, for example, windstorms, hurricanes, typhoons or cyclones.

These wind events can sometimes result in extreme loads on the wind power installations, which need to be prevented, for example by means of a horizontal positioning or adjustment of the nacelle into the wind.

Owing to the wind event, however, it may arise that the wind power installation or the electrical power supply grid is only operational to a certain extent, for example the wind event is so severe that neither the wind power installation nor the electrical power supply grid can be operated properly.

In order nevertheless to keep the severe loads on the wind power installation as a result of the wind event under control, active correction of the nacelle of the wind power installation by means of so-called wind tracking is expedient.

BRIEF SUMMARY

Increasing the operational reliability of a wind power installation even in very windy locations is provided herein.

A method is proposed for operating a wind power installation, comprising the following steps: starting a discharge operation of an electrical store of an uninterruptible power supply, in particular at a specific time; performing the discharge operation of the electrical store of the uninterruptible power supply until the electrical store has a predetermined discharge voltage; detecting a discharge current of the electrical store during the discharge operation; and determining a capacity of the electrical store from the detected discharge current.

It is therefore in particular proposed that the wind power installation has at least one uninterruptible power supply and is preferably operated as is conventional, in particular in a conventional or normal operating mode.

The wind power installation is therefore configured in a preferable manner, as described below, and in particular comprises an uninterruptible power supply having an electrical store, which is preferably in the form of a rechargeable battery.

The uninterruptible power supply is in this case in particular designed to supply electrical energy to at least one azimuth motor of the wind power installation so that the azimuth motor can orient the wind power installation, in particular the nacelle of the wind power installation, into the wind, preferably even during a wind event, such as, for example, a storm.

It is therefore in particular also proposed to orient the wind power installation into the wind in the event of failure of the electrical power supply grid.

In the (normal) operating mode of the wind power installation, in particular the ability of the electrical store to function is now tested, in particular in order to ensure that the electrical store can also make available sufficient electrical energy in a case of requirement, i.e., for example in the event of a storm, to orient the nacelle of the wind power installation.

Such a case of requirement exists, for example, when a wind event occurs which results in disruption to the operation of the wind power installation and/or the electrical power supply grid. As a result of the wind event, the wind power installation may now be operational only to a certain extent, for example, and should be oriented correctly into the wind in order to avoid damage to the wind power installation, for example, by virtue of an adjustment of the nacelle of the wind power installation by means of an azimuth adjustment.

The starting of the discharge operation of the electrical store in this case takes place, for example, preferably manually by service personnel, for example decentrally from outside the wind power installation, by actuation of a button which triggers the test operation in the wind power installation.

The discharge operation in this case generates in particular a preferably complete discharge of the electrical store, in particular until the electrical store has a predetermined discharge voltage.

The predetermined discharge voltage can also be referred to as end-of-discharge voltage and is, for example, approximately 10 volts (V). In one example, 12V lead-crystal rechargeable batteries are used. A particularly advantageous feature of these rechargeable batteries is that they can better withstand lower temperatures. The rated capacity (10 hour rate) for these rechargeable batteries is, for example, 66 ampere hour (Ah), and 24 items thereof are interconnected in series, and thus a rated voltage of 288 V is provided. A bidirectional DC/DC converter then steps up this voltage to a DC-link voltage of, for example, 550 V to 700 V. The end-of-discharge voltage is then based on the current load of this rechargeable battery and is, for example, between 7 V and 12 V.

In a preferred embodiment, the electrical store, in particular the rechargeable battery, is kept continuously on trickle charge and is used directly in the event of a grid failure. In this case, primarily a first part of the wind power installation is supplied power from the rechargeable battery. This includes, for example, the anemometer for monitoring the wind speed and the wind direction. If it is then identified that, owing to the wind event, wind tracking is necessary, a second part of the wind power installation, for example an azimuth motor of the wind power installation for the wind tracking of the nacelle, is supplied power from the rechargeable battery. Once the nacelle has then been oriented, the power supply for the second part is switched off again and only the first part is supplied power. This procedure in particular increases the running time of the rechargeable battery. The method described above or below, i.e., in particular the testing of the electrical store, is in particular not performed when the electrical power supply grid has failed and/or a specific, preferably high-wind, wind event, such as, for example, a storm, prevails.

In addition, during the discharge operation, the discharge current of the electrical store is detected, preferably over time.

The detection of the discharge current can be performed, for example, by means of current detection (e.g., ammeter or multimeter), preferably directly, at the electrical store.

The current detection is, for example, arranged directly at an output of the rechargeable battery and has, for example, a DC measurement, preferably in a current range of from −100 ampere (A) to +100 A.

Then, the instantaneous capacity of the electrical store is determined from the detected discharge current (I) and the duration of the discharge operation (t), i.e., the time from the start of the discharge operation up to the time at which the predetermined discharge voltage is reached.

The capacity can be determined, for example, from $C=I*t$. Since the current is measured continuously by the current detection and is preferably subject to closed-loop control by an active controller, capacity can be determined as an integral ($I*dt$), preferably with a fixed clock, in particular of less than two seconds, preferably with a clock of 0.5 seconds (s).

In a preferred embodiment, the residual capacity of the electrical store is determined as a function of the discharge current.

The residual capacity is then set in relationship with the rated capacity in order to determine the so-called state of health (SoH for short).

Preferably, the discharge current is made available to the grid injection of the wind power installation via a DC/DC chopper. It is therefore in particular also proposed to supply the discharge current to an intermediate circuit or to recharge the rechargeable batteries after the test from this intermediate circuit.

In a preferred embodiment, the method described above or below, in particular the test, is not performed or interrupted when at least one of the following conditions is present: lack of wind, installation fault, failure of the electrical power supply grid.

It is therefore in particular proposed to perform the discharge operation until the electrical store has a determined discharge voltage.

Then, the instantaneous or present capacity of the electrical store is determined from the duration of this discharge operation and the discharge current detected in the process.

This instantaneous or present capacity of the electrical store determined in this way is set in relationship with the rated capacity of the electrical store. Then, the ability of the electrical store to operate is derived from the quotient of the present capacity to the rated capacity, and this is 80%, for example. If this quotient is too small, for example, the electrical store should be replaced, in particular in order to be able to ensure consistently a power supply to the azimuth adjustment.

In a preferred embodiment, the ambient temperature and/or the operating temperature of the electrical store is taken into consideration in the determination of the capacity.

Preferably, the discharge current is injected into the electrical power supply grid.

It is therefore in particular proposed to use the discharge current, and not to convert it into thermal energy, for example via an electrical resistor with a high resistance value.

Preferably, the method further comprises the following step: generating an operating signal, in particular for a wind power installation control unit, wherein the operating signal indicates a sufficient residual capacity of the electrical store.

In addition or as an alternative, the method also comprises the following step: generating a warning signal, in particular for a wind power installation control unit, wherein the warning signal indicates an insufficient residual capacity of the electrical store.

It is therefore in particular also proposed to transmit the state of the electrical store to the wind power installation control unit.

This can take place in particular by means of an operating and/or warning signal.

The operating signal in this case in particular indicates that the electrical store is functional.

The warning signal in this case in particular indicates that the electrical store is no longer functional or is restricted.

It is therefore in particular proposed that the test of the electrical store for functionality is performed in automated fashion. The test itself is in turn preferably initiated manually by service personnel. The test can therefore be performed, for example, prior to a typhoon season.

Preferably, the discharge current corresponds to a setpoint discharge current, which is set by means of a current limit.

It is therefore in particular proposed that the electrical store is discharged in a specific way, namely with a predetermined setpoint discharge current which is set, for example, via a DC/DC chopper.

Preferably, a current limit is used for this purpose. The current limit indicates the maximum permissible discharge current.

Preferably, the discharge current is forced or set by means of a DC/DC converter.

The discharge current is therefore set in particular by means of a DC/DC converter, in particular in such a way that the discharge current corresponds to the setpoint discharge current.

Preferably, the DC/DC converter for this purpose is in the form of a DC/DC chopper.

Preferably, the discharge current is supplied to an intermediate circuit, in particular a DC link.

It is therefore in particular proposed not to simply convert the electrical energy of the discharge current into thermal energy, but to use it in a sensible manner.

For this purpose, it is in particular proposed to pass the discharge current into the DC link of the power converter of the wind power installation, in particular in order to inject the discharge current into the electrical power supply grid.

Preferably, the discharge current is then injected into the electrical power supply grid from the DC link.

Preferably, the discharge current is detected over a discharge time.

It is therefore in particular proposed to detect the discharge operation and in particular the discharge current over the entire time or to detect the duration of the discharge operation.

Preferably, the discharge operation comprises at least temperature compensation or discharge compensation.

It is therefore in particular proposed that, during the discharge operation, in particular during the detection of the discharge current, a temperature, for example the ambient temperature or the operating temperature of the electrical store, or the discharge current itself is taken into consideration. This is based on the knowledge that, depending on the temperature and/or discharge current, the electrical store has different properties, such as, for example, quicker discharge.

Preferably, the specific time is within a predetermined time period, which has been selected taking into consideration the location of the wind power installation.

Preferably, the method described above or below, in particular the test, is performed automatically, wherein the time for performing the method is selected taking into consideration a location of the wind power installation and/or the date and/or a present operating state of the rechargeable battery.

Preferably, the consideration of the location of the wind power installation includes data on at least one from the following list: geographical data relating to the installation site of the wind power installation; weather data at the installation site of the wind power installation; meteorological data at the installation site of the wind power installation; calendar dates and/or calendar time periods.

In addition, a wind power installation is proposed, at least comprising: an aerodynamic rotor, which is designed to generate a mechanical rotary movement from wind; a generator, which is designed to generate electrical energy from the mechanical rotary movement; an intermediate circuit, which is designed to provide the electrical energy generated by the generator to a power inverter; a power inverter, which is designed to inject the electrical energy from the intermediate circuit into an electrical power supply grid; an electrical store, which is connected to the intermediate circuit and which is designed: to exchange electrical energy with the DC link, and to store electrical energy, and to provide electrical energy for an uninterruptible power supply; an uninterruptible power supply, which is connected to the intermediate circuit and the electrical store and which is designed to provide electrical power from the DC link and/or the electrical store for an azimuth adjustment.

The generator is in the form of, for example, a six-phase synchronous generator and generates a 2×3-phase AC voltage.

This AC voltage is rectified into a DC voltage by means of a rectifier and applied to the intermediate circuit, which can also be referred to as a DC link.

The wind power installation additionally has in particular an electrical connection between the intermediate circuit and the uninterruptible power supply and the electrical store.

The uninterruptible power supply is in this case in particular used to adjust the azimuth of the wind power installation, in particular of the nacelle of the wind power installation, by means of an azimuth adjustment, in particular an azimuth motor.

Preferably, the wind power installation further comprises an uninterruptible power supply, which is connected to the intermediate circuit and the electrical store and which is designed to provide electrical power from the DC link and/or the electrical store for an azimuth adjustment.

It is therefore in particular proposed to design the electrical store in such a way that the electrical store can provide sufficient electrical energy in order to adjust the azimuth of the wind power installation at any time, in particular even when the wind power installation cannot be operated owing to a storm and/or the electrical power supply grid has dropped out or entered blackout.

Preferably, the wind power installation further comprises an azimuth adjustment comprising an azimuth motor, which is designed to adjust the azimuth angle of the wind power installation by means of the azimuth motor by means of electrical power from the electrical store.

Preferably, the uninterruptible power supply is designed to supply electrical energy to at least one azimuth motor of the azimuth adjustment in such a way that the wind power installation can be oriented into the wind by means of the azimuth motor.

Preferably, the uninterruptible power supply is also designed to supply electrical energy to the at least one azimuth motor of the wind power installation even during a failure of an electrical power supply grid, which is electrically connected to the wind power installation, in such a way that the wind power installation can be oriented in the wind by means of the azimuth motor.

Preferably, the wind power installation further comprises a rectifier, which is designed to convert the electrical energy generated by the generator into a DC voltage and to provide this DC voltage to the intermediate circuit.

Preferably, the wind power installation further comprises a control unit, which is designed to implement a method as described above and/or below.

Preferably, the electrical store is arranged in a housing which has an operating temperature which is kept substantially constant by means of a fan and/or a heater.

It is therefore in particular also proposed to arrange the electrical store in a cabinet and to keep the internal temperature of the cabinet as constant as possible, in particular in order to protect the electrical store from an excessively low and/or excessively high temperature.

BRIEF DESCRIPTION OF THE SEVERAL VIEWS OF THE DRAWINGS

The present invention will now be explained in more detail below by way of example using exemplary embodiments with reference to the attached figures, wherein the same reference symbols are used for identical or similar assemblies.

DETAILED DESCRIPTION

Figure 1:
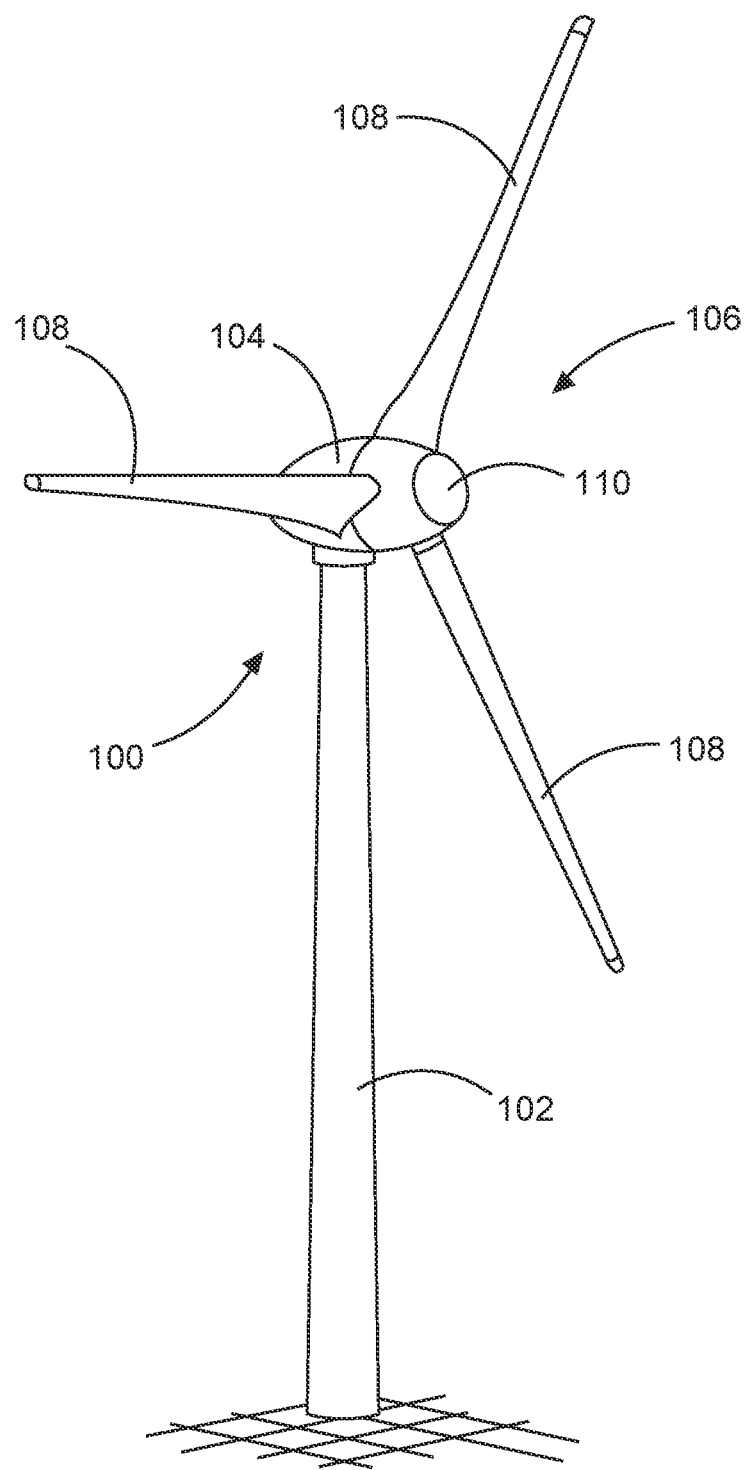
FIG. 1 shows a schematic view of a wind power installation in accordance with one embodiment.

FIG. 1 shows a schematic view of a wind power installation 100 in accordance with one embodiment.

The wind power installation 100 has a tower 102 and a nacelle 104. An aerodynamic rotor 106 having three rotor blades 108 and a spinner 110 is arranged on the nacelle 104. The rotor 106, during operation, is set in rotary motion by the wind and thereby drives a generator in the nacelle 104.

In addition, a control unit (e.g., controller) described above or below is provided for the operation of the wind power installation, said control unit being designed to orient the nacelle of the wind power installation in the wind by means of an azimuth adjustment motor and/or drive.

Figure 2:
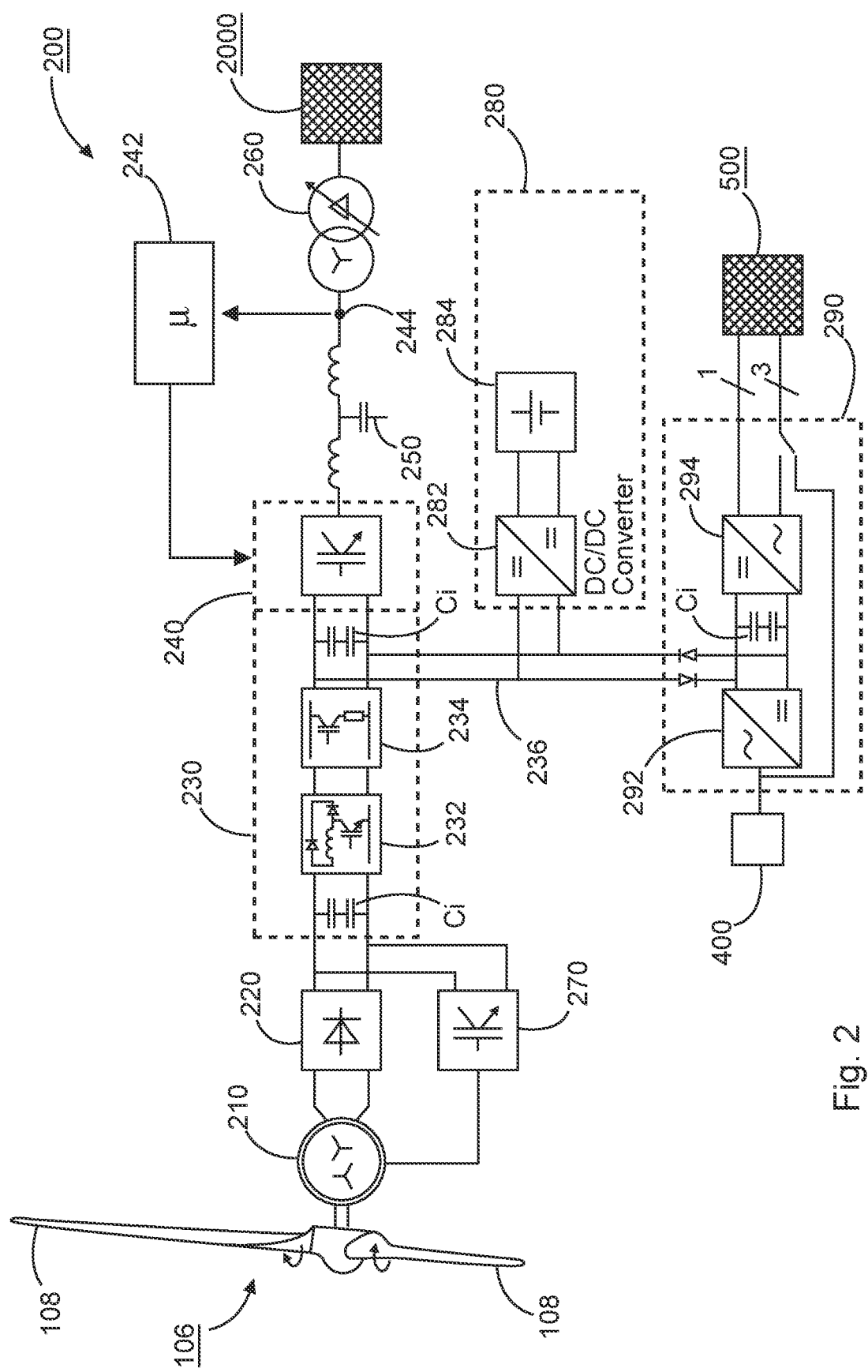
FIG. 2 shows a schematic design of an electrical phase of a wind power installation in accordance with one embodiment.

FIG. 2 shows a schematic design of an electrical phase (e.g., stage) 200 of a wind power installation, in particular as shown in FIG. 1, in accordance with one embodiment.

The wind power installation comprises an aerodynamic rotor 106 having three rotor blades 108 which is connected to the electrical phase 200.

The electrical phase 200 has a generator 210, a rectifier 220, an intermediate circuit 230, an inverter 240, a filter 250, a transformer 260, an excitation (e.g., excitation system) 270, an electrical store (e.g., battery) 280 and an uninterruptible power supply 290.

The aerodynamic rotor 106 is designed to generate a mechanical rotary movement from wind.

This mechanical rotary movement is transmitted to the generator 210, for example by means of a shaft.

The generator 210 is designed to generate an electrical energy, in particular in the form of a polyphase alternating current, for example a three-phase alternating current, from the mechanical rotary movement.

This polyphase alternating current is transmitted to a rectifier 220.

The rectifier 220 is designed to convert the polyphase alternating current into a DC voltage.

This DC voltage is applied to an intermediate circuit 230.

The intermediate circuit 230 is designed to provide the electrical energy generated by the generator at a power inverter.

This intermediate circuit 230 can also be referred to as a DC link.

The power inverter 240 is designed to inject the electrical energy from the intermediate circuit into an electrical power supply grid 2000. For this purpose, the power inverter 240 has, at its output, for example, a filter 250, preferably an LCL filter, and a transformer 260. The control of the power inverter 240 takes place via a control unit (e.g., controller) 242, which detects, for example, the current, the voltage and the frequency at the output of the power inverter 242.

Preferably, the power inverter 240 is designed to be modularized, i.e., there is a plurality of parallel power inverter modules, which are each preferably accommodated in a power cabinet, for example each with a rated power of 400 kilowatt (kW).

In a preferred embodiment, the power inverter 240 injects the electrical energy in three-phase fashion into the electrical power supply grid 2000.

The rectifier 220, the intermediate circuit 230 and the power inverter 240 together form a power converter 220, 230, 240, which is preferably in the form of a full-power converter, i.e., all of the electrical energy generated by the generator 210 of the wind power installation is conducted via this power converter.

In order to regulate the electrical energy generated by the generator 210, in addition, an excitation 270 is provided, which is connected to the intermediate circuit 230.

The intermediate circuit 230 comprises a plurality of capacitors Ci, a step-up converter 232 and a chopper 234.

The capacitors Ci in this case have in particular the object of smoothing the DC voltage and keeping it constant. These capacitors are both functionally and physically different from the electrical store described herein.

The intermediate circuit 230 in addition has a DC voltage output 236, at which the electrical store 280 and the uninterruptible power supply 290 are arranged.

The electrical store, 280, which is in particular in the form of a rechargeable battery, for example a 100 Ah rechargeable battery, is connected to the DC voltage output 236 via a rectifier 282. The electrical store is therefore in particular not part of the DC link 230 of the power inverter 220, 230, 240.

In addition, the electrical store 280 comprises a capacitive storage unit (e.g., storage capacitors) 284, the actual rechargeable battery, which preferably consists of a stack of rechargeable batteries, for example of 24 rechargeable batteries each having 12 V, which preferably together provide 288 V.

The uninterruptible power supply 290 is connected directly to the DC voltage output 236 and therefore also to the electrical store 280.

In addition, the uninterruptible power supply has at least one inverter 292, which is connected to the 400 V grid 400 of the wind power installation.

In addition, the uninterruptible power supply 290 has an inverter 294, which is connected to the emergency power supply grid 500 of the wind power installation.

The emergency power supply grid 500 is the electrical grid, which supplies electrical energy in any case to the azimuth adjustment, in particular in order to be able to adjust the azimuth of the wind power installation even in the event of a typhoon and/or in the event of a failure of the electrical power supply grid, as described above.

Figure 3:
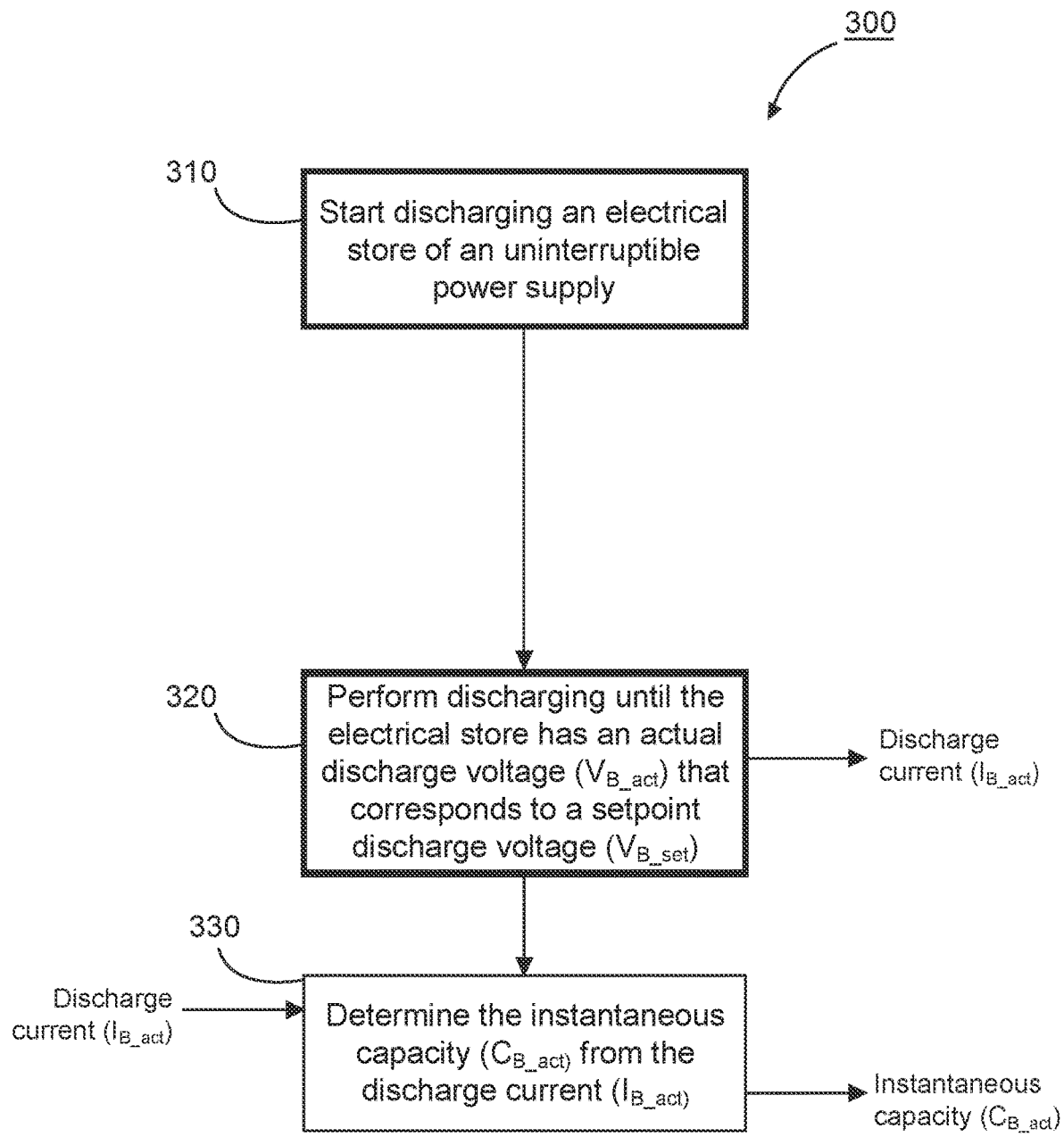
FIG. 3 shows a schematic flowchart of a method for operating a wind power installation in accordance with one embodiment.

FIG. 3 shows a schematic flowchart 300 of a method for operating a wind power installation in accordance with one embodiment.

In a first step 310, the discharge operation of an electrical store of an uninterruptible power supply is started.

This discharge operation 320 is performed until the electrical store has an actual discharge voltage $V_{B\_act}$ which corresponds to a predetermined discharge voltage $V_{B\_set}$. This predetermined discharge voltage $V_{B\_set}$ can also be referred to as setpoint discharge voltage.

During this discharge operation, the discharge current $I_{B\_act}$ is detected, and then an instantaneous capacity $C_{B\_act}$ of the electrical store is determined therefrom. This is indicated by block 330.

LIST OF REFERENCE SYMBOLS 100 wind power installation
102 tower, in particular of wind power installation
104 nacelle, in particular of wind power installation
106 aerodynamic rotor, in particular of wind power installation
108 rotor blade, in particular of wind power installation
110 spinner, in particular of wind power installation
200 electrical phase, in particular of wind power installation
210 generator, in particular of electrical phase
220 rectifier, in particular of electrical phase
230 intermediate circuit, in particular of electrical phase
232 step-up converter, in particular of intermediate circuit
234 chopper, in particular of intermediate circuit
236 DC voltage output, in particular of intermediate circuit
240 power inverter, in particular of electrical phase
250 filter, in particular of electrical phase
260 transformer, in particular of electrical phase
270 excitation, in particular of electrical phase
280 electrical store, in particular of electrical phase
282 rectifier, in particular of electrical store
284 capacitive storage unit, in particular of electrical store
290 uninterruptible power supply, in particular of wind power installation
292 inverter, in particular for 400V grid of wind power installation
300 Method for operating a wind power installation
310 Starting of a discharge operation
320 Performance of the discharge operation
400 400V grid of wind power installation
500 emergency power supply grid of wind power installation
Ci capacitor
$I_{B\_act}$ discharge current of electrical store
$C_{B\_act}$ capacity of electrical store, in particular instantaneous capacity
$V_{B\_act}$ actual discharge voltage of electrical store
$V_{B\_set}$ setpoint discharge voltage of electrical store The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for operating a wind power installation, comprising:
   starting a discharge operation of an electrical store of an uninterruptible power supply;
   performing the discharge operation until the electrical store has a predetermined discharge voltage;
   detecting a discharge current of the electrical store during the discharge operation; and
   determining a capacity of the electrical store from the discharge current.

2. The method as claimed in claim 1, comprising:
   supplying the discharge current to an electrical power supply grid.

3. The method as claimed in claim 1, comprising:
   generating an operating signal indicating to a controller of the wind power installation a sufficient residual capacity of the electrical store, wherein the electrical store is a battery.

4. The method as claimed in claim 1, comprising:
   generating a warning signal indicating to a controller of the wind power installation an insufficient residual capacity of the electrical store.

5. The method as claimed in claim 1, wherein the discharge current corresponds to a setpoint discharge current representing a current limit.

6. The method as claimed in claim 5, wherein the discharge current is forced to the setpoint discharge current by a DC/DC converter.

7. The method as claimed in claim 1, comprising:
   supplying the discharge current to an intermediate DC circuit.

8. The method as claimed in claim 7, comprising:
   supplying the discharge current from the intermediate DC circuit to an electrical power supply grid.

9. The method as claimed in claim 1, comprising:
   detecting the discharge current over a discharge time.

10. The method as claimed in claim 1, wherein the discharge operation includes at least one of: temperature compensation or discharge compensation.

11. The method as claimed in claim 1, comprising:
    selecting a time period based on a location of the wind power installation; and
    starting the discharge operation at a first time within the time period.

12. The method as claimed in claim 11, wherein selecting the time period based on the location of the wind power installation includes selecting the time period based on data including at least one of:
    geographical data relating to an installation site of the wind power installation;
    weather data at the installation site of the wind power installation;
    meteorological data at the installation site of the wind power installation; or
    calendar dates and/or calendar time periods.

13. A wind power installation, comprising:
    an aerodynamic rotor configured to generate mechanical rotary movement from wind;
    a generator configured to generate electrical energy from the mechanical rotary movement;
    an intermediate circuit configured to provide the electrical energy generated by the generator;
    a power inverter configured to inject the electrical energy from the intermediate circuit into an electrical power supply grid; and
    an electrical store coupled to the intermediate circuit and configured to:
        exchange electrical energy with the intermediate circuit;
        store electrical energy received from the intermediate circuit; and
        provide the electrical energy received from the intermediate circuit to an uninterruptible power supply.

14. The wind power installation as claimed in claim 13, wherein the uninterruptible power supply is coupled to the intermediate circuit and the electrical store, and wherein the uninterruptible power supply is configured to provide the electrical energy received from the intermediate circuit and/or the electrical store to an azimuth adjustment drive.

15. The wind power installation as claimed in claim 13, comprising:
    an azimuth adjustment drive including an azimuth motor configured to adjust an azimuth angle of the wind power installation using the electrical energy received from the electrical store.

16. The wind power installation as claimed in claim 13, wherein the uninterruptible power supply is configured to supply the electrical energy received from the electrical store to at least one azimuth motor of the wind power installation to orient the wind power installation.

17. The wind power installation as claimed in claim 16, wherein the uninterruptible power supply is configured to supply the electrical energy received from the electrical store to the at least one azimuth motor of the wind power installation during a failure of the electrical power supply grid coupled to the wind power installation to orient the wind power installation.

18. The wind power installation as claimed in claim 13, comprising:
    a rectifier configured to convert the electrical energy generated by the generator into a DC voltage and provide this DC voltage to the intermediate circuit.

19. The wind power installation as claimed in claim 13, comprising:
    a controller configured to:
        start a discharge operation of the electrical store;
        perform the discharge operation until the electrical store has a predetermined discharge voltage;
        detect a discharge current of the electrical store during the discharge operation; and
        determine a capacity of the electrical store from the discharge current.

20. The wind power installation as claimed in claim 19, wherein the controller is configured to:
    receive an operating signal indicating a sufficient residual capacity of the electrical store, wherein the electrical store is a battery; and
    receive a warning signal indicating an insufficient residual capacity of the electrical store, wherein the discharge current corresponds to a setpoint discharge current representing a current limit.

* * * * *